United States Patent [19]

Darling

[11] Patent Number: 4,615,812
[45] Date of Patent: Oct. 7, 1986

[54] FILTER HOUSING FOR CLOSED FLUID CIRCULATING SYSTEM

[75] Inventor: Phillip H. Darling, Huntington Beach, Calif.

[73] Assignee: Metro-Line Industries, Inc., Brea, Calif.

[21] Appl. No.: 664,978

[22] Filed: Oct. 26, 1984

[51] Int. Cl.⁴ .............................................. B01D 35/14
[52] U.S. Cl. .................................. 210/805; 210/234
[58] Field of Search ................ 210/234, 235, 238, 805

[56] References Cited

U.S. PATENT DOCUMENTS

| | | | |
|---|---|---|---|
| 2,991,885 | 7/1961 | Gutkowski | 210/234 |
| 3,347,386 | 10/1967 | Kraissl, Jr. | 210/238 |
| 4,367,144 | 1/1983 | Peters et al. | 210/234 |
| 4,529,515 | 7/1985 | Selz | 210/235 |

Primary Examiner—John Adee
Attorney, Agent, or Firm—Knobbe, Martens, Olson & Bear

[57] ABSTRACT

A fluid containing system, as in a filter, for toxic or hazardous fluids is provided with rotatable base seals that can be alternatively positioned to permit the flow of fluids from the filter supply line, passing through the filter or, alternatively, the filter supply line can be sealed shut to prevent fluid leakage when the filter is removed. A third filter seal position is provided, wherein a cleaning fluid, for example compressed air, can be supplied to the filter in order to remove excess fluid from the filter prior to removal. An alternative embodiment permits removal of the filter and sealing of the supply line by rotating the filter and seal assembly about the supply line access to save space or to facilitate changing the filter. The fluid containing system can also function as a fluid sampler, or to add materials to the fluid system.

19 Claims, 12 Drawing Figures

U.S. Patent   Oct. 7, 1986   Sheet 1 of 4   4,615,812
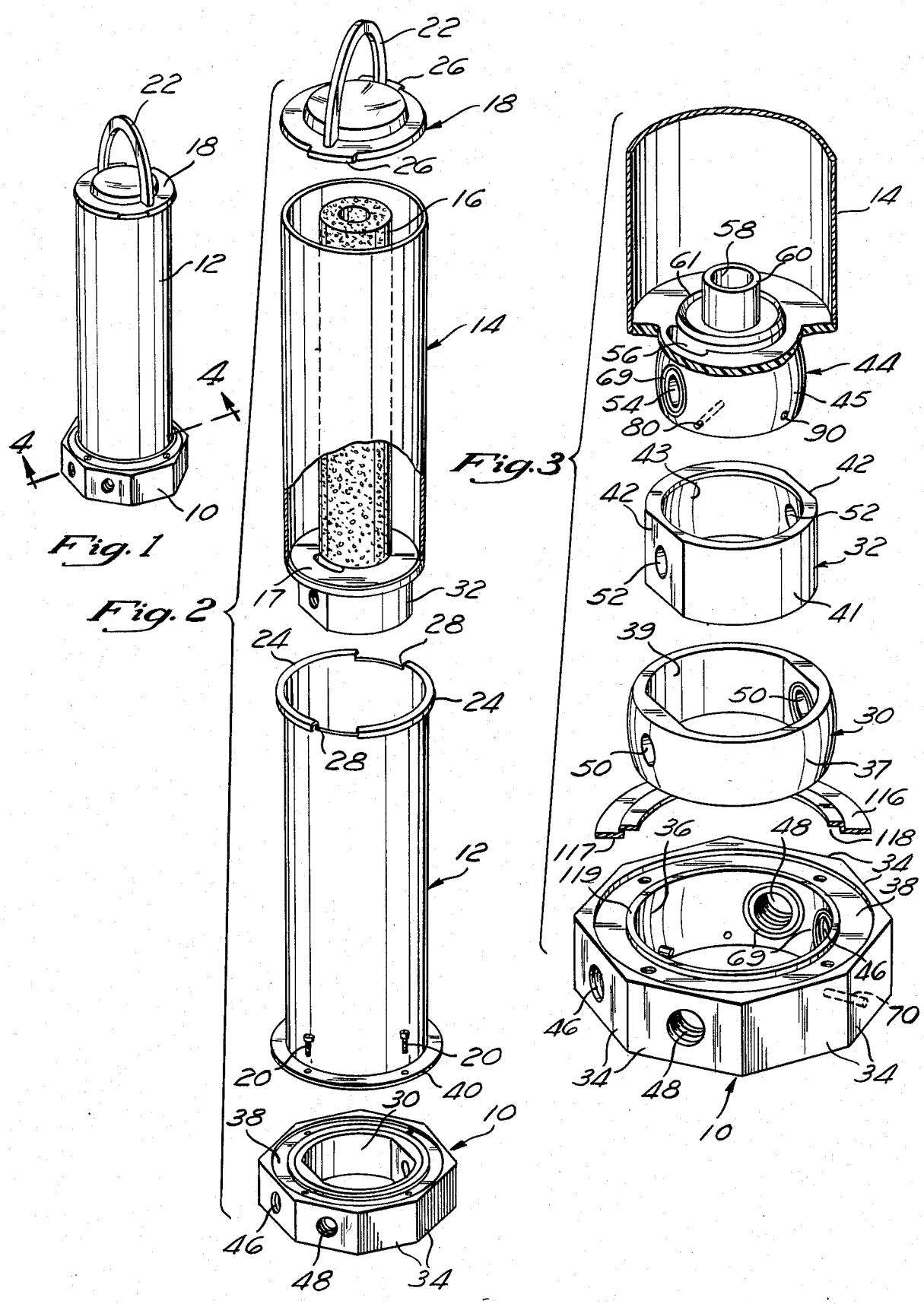

U.S. Patent   Oct. 7, 1986   Sheet 2 of 4   4,615,812
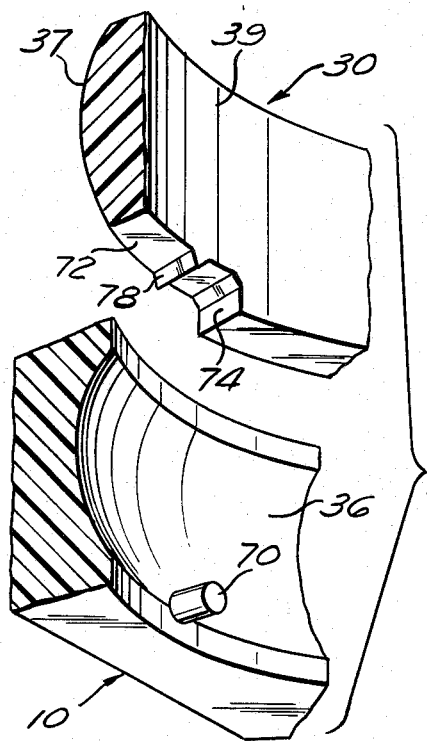
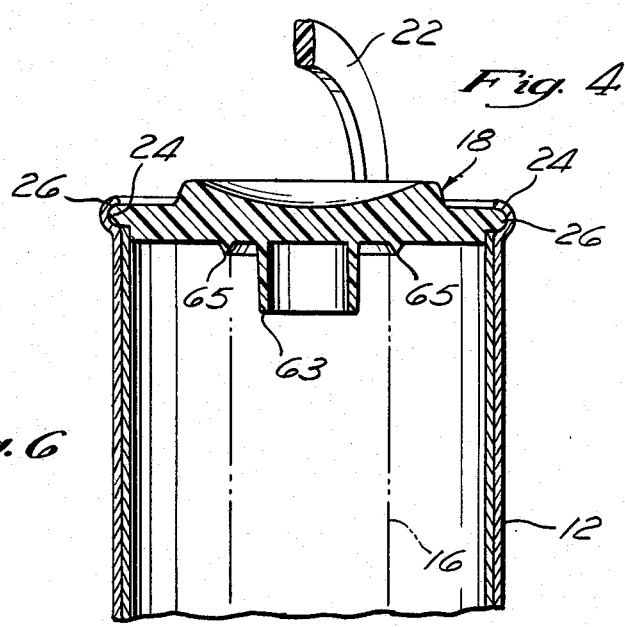
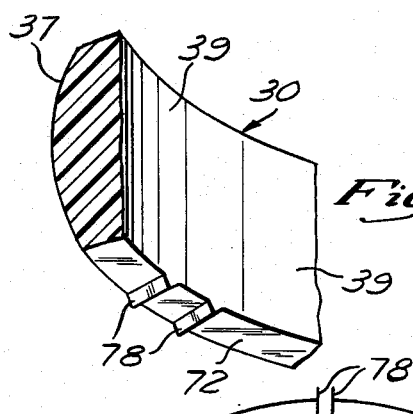
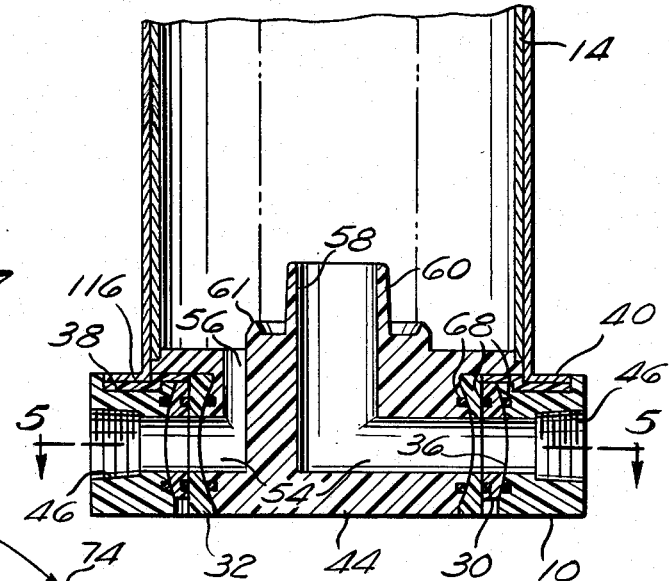
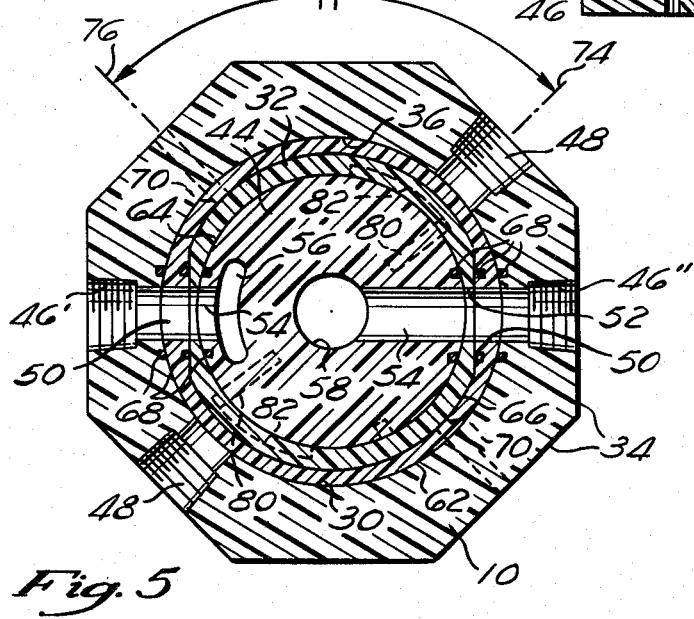

FILTER HOUSING FOR CLOSED FLUID CIRCULATING SYSTEM

BACKGROUND OF THE INVENTION

The present invention relates generally to fluid filters and more particularly to fluid filters used in closed fluid circulating systems.

Fluid filters are frequently used in closed fluid circulating systems. Such systems will typically consist of a supply line, a return line, a pump, and a reservoir for the excess fluid. A filter housing containing a filter element(s) is typically located in or on a branch of the supply line so that the fluid is filtered as it circulates in the system. A familiar example of such a closed system is the oil circulation system of an automobile.

In most industrial applications, the filter housing and filter element are not formed as an integral unit, and replacing the filter element inevitably creates several potential problems. The supply line connections to the filter housing are open and exposed, permitting vapor and liquid leakage. This can result in the possible contamination of the surrounding environment, and adversely affect the health of any operating or maintenance personnel in the area. The filter housing itself must also be drained and cleaned, providing both additional opportunities for leakage and further complicating the filter replacement process.

An additional waste-related problem encountered during filter replacement results from the concentration of waste materials within the filter due to the filtering operation itself. These concentrated wastes remain within the filter housing along with some remaining fluid, and provide additional opportunities for leakage.

These various leakage problems are only a nuisance to be cleaned-up when oil leaks from an automotive oil system; however, it can be dangerous, even deadly where the circulating system contains toxic and ultrahazardous chemical wastes, which are in turn further concentrated by the filter.

The use of such toxic materials in the workplace is subject to a number of federal and state occupational safety regulations, which in turn cause the filter replacement procedure to be both cumbersome and expensive. Moreover, the environmental rules and regulations require that the used filter elements and contaminated clean-up materials be sealed in a container and disposed of in a safe manner.

The vapor deposition process used to manufacture many of the electronic components being used today is a prime generator of a fluid that is contaminated with deadly poisons. The various substrate layers are applied as vapors under high temperatures and strong vacuums. The lubricant used to seal and lubricate the vacuum pump soon becomes contaminated with toxic, abrasive, and corrosive wastes that must be removed to avoid damage to the pump. A filter is used to clean this lubricant, and consequently concentrates all of these hazardous materials within the filter and filter housing. The removal and disposal of the filter, under the prior systems, was a difficult and dangerous job.

SUMMARY OF THE INVENTION

In one application, the present invention relates to a fluid filter that overcomes the previously mentioned problems of conventional filters. In one embodiment of the present invention, the filter consists of a housing, a filter element, and a rotatable base. Two separate supply lines, a filter line and a cleaning or blow-down line, supply fluid to the filter through its base. The filter line supplies the liquid that is to be filtered. The blow-down line supplies a different fluid, such as compressed air or a cleaning solvent.

By rotating the filter housing in the filter base from an initial, insertion position of this embodiment, passages to the filter are opened and a particular supply line may be selected so that fluid from the selected line passes through the filter. For example, when the base of the filter is in one position, apertures in the base form a passage through the filter to allow liquid from the filter line to pass through the filter element. When in this position, sealing rings in the filter base disconnect the blow-down line from the filter, sealing shut both ends of the blow-down line. When the base is rotated to a second position, the filter line is sealed shut and fluid from the blow-down line is allowed to pass through the filter. When the base is in this position, fluid from the blow-down line, such as compressed air, is passed through the filter element, forcing out any remaining liquid from the filter and filter element. As a result of this blow-down process, the filter, when removed, will be empty of the majority of liquid filtrate. This can be important where, as in the vapor deposition application, the filtered lubricant is expensive, frequently costing as much as $1,800 per gallon.

In order to remove the filter, the base is rotated to the initial position. While in this position, the base sealing rings seal both the filter and blow-down lines so that no fluid (liquid or vapor) can escape from either. The passages in the filter housing are also sealed. The filter may be then removed without any leakage or spillage from the filter or the filter lines.

It should be understood that rotating the base of the above-described embodiment is just one way to achieve the desired result. For example, instead of rotating the base to select the appropriate supply line, the two supply lines could be placed one directly on top of another and the base or the whole filter could be raised or lowered to select the appropriate supply line.

Further, the blow-down line may be joined with the filter line so that the liquid blown out of the filter in the blow-down process is returned to the circulating system. This joining of the blow-down line with the filter line is especially advantageous where the liquid being filtered is expensive or toxic, since the liquid and any vapors are confined to the circulating system and cannot leak into the outside environment.

During normal operation, the base of the filter is aligned so that liquid from the filter supply line passes through the filter. In order to replace the filter, its base is rotated so that the blow-down line is selected and the filter supply line is sealed shut. In this mode of operation, any remaining liquid in the filter is blown out of the filter and back into the circulating system through the blow-down return line by the compressed air introduced at the blow-down inlet line. After this blow-down process is complete, the filter base is then rotated so that both the supply and the blow-down lines are closed, as are the filter passages. The filter can then be removed without leakage from the filter lines or the spillage of of any excess fluid remaining in the filter itself. Hazardous materials in the filter circuit, whether particulate, liquid or vaporous, are isolated from operating personnel and the surrounding environment at all times; during insertion of the filter, its use; the blowdown operation, and during removal and disposal of the filter.

The present invention can also be incorporated into a fluid sample-taker for taking fluid samples from a closed circulating system. The sampler consists of a base through which all or a portion of the fluid in the circulating system flows, and a removable fluid container with a riser tube in place of the filter element. The fluid container fills if inserted into the base to collect a fluid sample. When the container is full, it is removed from the base without interrupting the flow of the circulating system. Prior to removal from the base, the container is automatically sealed shut to prevent leakage of the fluid from the container as well as from the circulating system.

DESCRIPTION OF THE DRAWINGS

These and other advantages of the present invention are best understood by reference to the drawings in which:

FIG. 1 is a perspective view of the filter of the present invention;

FIG. 2 is an exploded view of the filter showing its constituent parts;

FIG. 3 is an exploded view of the bottom portion of the filter;

FIG. 4 is a cross-sectional side view of the filter taken along line 4—4 in FIG. 1;

FIG. 5 is a cross-sectional top view of the filter taken along line 5—5 in FIG. 4 when the filter is configured for the filtering mode;

FIG. 6 is a perspective view of the peg-and-groove assembly incorporated in the filter;

FIG. 7 is a perspective view of a temporary stop as is incorporated in the filter;

DETAILED DESCRIPTION OF THE PREFERRED EMBODIMENT

Figure 8:
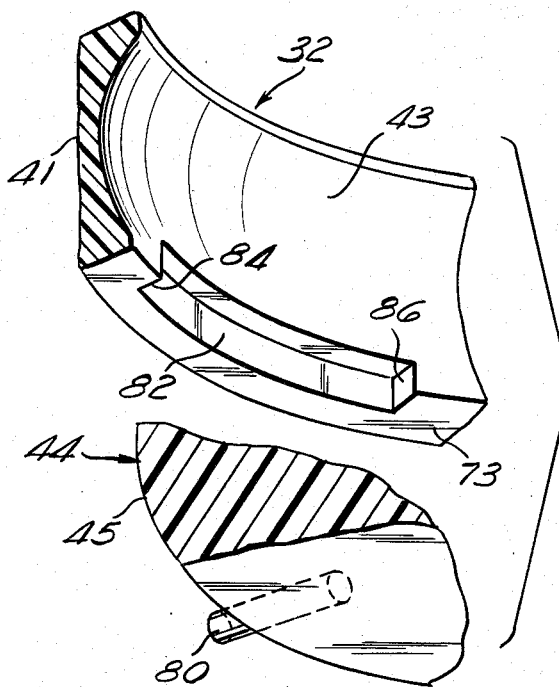
FIG. 8 is a perspective view of another peg-and-groove assembly incorporated in the filter.

FIG. 1 illustrates a filter of the preferred embodiment in completely assembled form. The "fluid" being filtered can be either liquid or gas, and can contain dissolved, admixed or entrained gaseous, liquid or particulate solid material, which it is desired to separate from the remaining fluid. FIG. 2 is an exploded view of the filter of FIG. 1. As can be seen from FIG. 2, the filter consists of a base 10, an outer housing 12, an inner housing assembly 14, a filter element 16, and a cover 18. Although the dimensions for a filter of this type are dictated to a large degree by the operating requirements for a particular system, in a preferred embodiment, the filter has a base 10 of approximately 4.5 inches (11.4 cm) and an inner housing assembly 14 of approximately 10.7 inches (27.2 cm) high with an outer diameter of approximately 3.5 inches (8.9 cm).

The housing 12 is mounted to the base 10 by a plurality of screws 20. The cover 18 is permanently sealed to the inner housing assembly 14 so that no fluid can escape from the point at which the cover 18 meets the inner housing assembly 14. The inner housing assembly 14 is rotatable within the outer housing 12 via a curved handle 22 mounted to the cover 18. The cover 18 is circular in shape and has two diametrically opposed tabs 26 extending from the outer edge of the cover 18. The housing 12 had two curved lips 24 extending from its upper edge. The inside surfaces of the two lips 24 are curved and conform to the curved outside surfaces of the two tabs 26 of the cover 18. The inner housing assembly 14 is inserted into the outer housing 12 by first aligning the two tabs 26 of the cover 18 to coincide with two spaces 28 between the two lips 24. When the inner housing assembly 14 is then rotated, the lips 24 encase the two tabs 26 and prevent any non-rotational movement of the housing assembly 14 with respect to the outer housing 12 and the base 10. Thus the inner housing assembly 14 can only be removed from the outer housing 12 when the two tabs 26 of the cover 18 are aligned to coincide with the spaces 28 of the outer housing 12.

The filter is designed so that rotating the inner housing assembly 14 by turning the handle 22 alters the flow path of the fluid through the filter by opening and closing valves, or rings, within the base 10. For example, when the inner housing assembly 14 is in one position with respect to the outer housing 12, fluid flow through the filter element 16 is allowed. When the inner housing assembly 14 is rotated to a second position, fluid flow through the filter element 16 is cut off and compressed air may be blown through the filter element 16. When the assembly 14 is rotated to a third position, all flow through the filter element 16 is cut off. When the assembly 14 is in this third position, the tabs 26 will be aligned with the openings 28 between the curved lips 24 so that the inner housing assembly 14 may then be removed. Thus, the inner housing assembly 14 cannot be removed from the outer housing 12 without shutting off all flow through the filter element 16.

The process of altering the flow of fluids through the filter can best be described by referring to FIG. 3, which is an exploded view of the bottom portion of the inner housing assembly 14, the base 10, a base ring 30, and a middle ring 32. The base 10 has eight flat surfaces 34 along its outer perimeter which form an octagon when viewed from above. The base 10 has a spherical curved inner surface 36. An annular recess 38 is formed in the otherwise flat top surface of the base 10 to accept the lower annular edge 40 (FIG. 2) of the outer housing 12.

The base ring 30 has an inner surface 39 and an outer surface 37. The outer surface 37 of the base ring 30 is spherically curved to conform to the inner surface 36 of the base 10. The base ring 30 is thus rotatable within the base 10. Because the base ring 30 meets the base 10 at a spherically curved interface 62 (shown in FIG. 5), the outer diameter at the top and bottom of the base ring 30 is smaller than the diameter at the center and thus the base ring 30 cannot easily be removed from the base 10 once properly seated within the curved interface 62. The middle ring 32, which has an inner surface 43 and an outer surface 41, is located within the base ring 30. The outer surface 41 of the middle ring 32 conforms to the inner surface 39 of the base ring 30 at an interface 66 (shown in FIG. 5), and is cylindrically shaped with two rectangular flat surfaces 42 diametrically opposite each other. The two flat surfaces 42, prevent the middle ring 32 from rotating within the base ring 30, but permit the axial removal of the middle ring 32 from the base ring 30. The inner surface 43 of the middle ring 32 is spherically curved in the same manner as that of the base 10. A housing ring 44, with an outer surface 45 is permanently attached to the bottom of the inner housing assembly 14, and is located within the middle ring 32. The outer surface 45 of the housing ring 44 is spherically curved to conform to the inner surface 43 of the middle ring 32 at an interface 64 (shown in FIG. 5). The housing ring 44 is rotatable within the middle ring 32 but is not removable from ring 32 due to the curved interface 64 between the two rings 32,44. Thus when the inner housing assembly 14 is lifted from the base 10, the middle ring 32 and the housing ring 44 stay attached to the housing assembly 14 and the base ring 30 stays within the base 10. Rotation can occur along the interface 62 of the base 10 and base ring 30 and also along the interface 64 of the housing ring 44 and the middle ring 32. These two interfaces 62, 64 are shown in FIG. 5. Rotation of the various rings along the interfaces 62,64 requires a gap or clearance between the adjacent rotating surfaces, and in the preferred embodiment this gap is approximately 0.005 inches (0.127 mm). Fluid leakage along the interfaces 62,64 is prevented by a plurality of O-rings 68. Circular grooves 69 are located in the inner surface 36, circumferentially about the supply line and blow-down line bores 46,48 in the base 10, and adjacent the base ring bore 50 in the inner surface 39 of the base ring 30 and circumferentially about bores 54 of the housing ring 44 in an outer surface 45 thereof. In the preferred embodiment, the O-rings 68 are made out of a fluorocarbon rubber (FKM), such as that marketed by DuPont under the trade name "VITON". To insure adequate sealing action by the O-rings, when manufactured out of such material, a "squeeze factor" of 15–20% must be provided. Mechanically, this means that the distance between the bottom of the groove 69 and the corresponding mating surface of the adjacent ring must be 15–20% less than the thickness of the O-ring 68.

Returning again to FIG. 3, the base 10 has two bores 46, which form part of the filter supply line, and two additional bores 48, which form part of the blow-down line. The bores 46 are diametrically opposed to each other, as are the bores 48. The base ring 30 has two diametrically opposed bores 50 and the middle ring 32 has two diametrically opposed bores 52. The bores 52 are located in the two flat surfaces 42 of the middle ring 32. Since the middle ring 32 is non-rotatable with respect to the base ring 30 along the interface 66, the bores 52 are aligned with the bores 50 as long as the inner housing assembly 14 is not removed from the base 10. The housing ring 44 has two bores 54 in its outer curved surface 45, which form the entrances to a passageway leading into the inner housing assembly 14. Fluid which enters through one opening 54 flows through this passageway and enters the inner housing assembly 14 at a curved oval opening 56. A circular opening 58 in a pipe 60 located inside the hollow filter element 16 forms the entrance to a passageway leading out of the inner housing assembly 14. This passageway terminates at the other circular opening 54 (not shown) in the outer curved surfaces of the housing ring 44. The two circular openings 54 are diametrically opposed to one another.

Fluid entering the inner housing assembly 14 at the opening 56 passes through the filter element 16, enters the opening 58 in the pipe 60, and exits the inner housing assembly at the circular opening 54 (not shown) in the outer surface of the housing ring 44. These passageways are illustrated more clearly in FIG. 4.

As shown in FIG. 4, the pipe 60 and an annular boss 61 help to seat the filter element 16 (shown in phantom) within the inner housing assembly 14 upon an inner assembly base 17. A similar pipe 63 and boss 65 help to seat the opposite end of the filter element 16.

Figure 12:
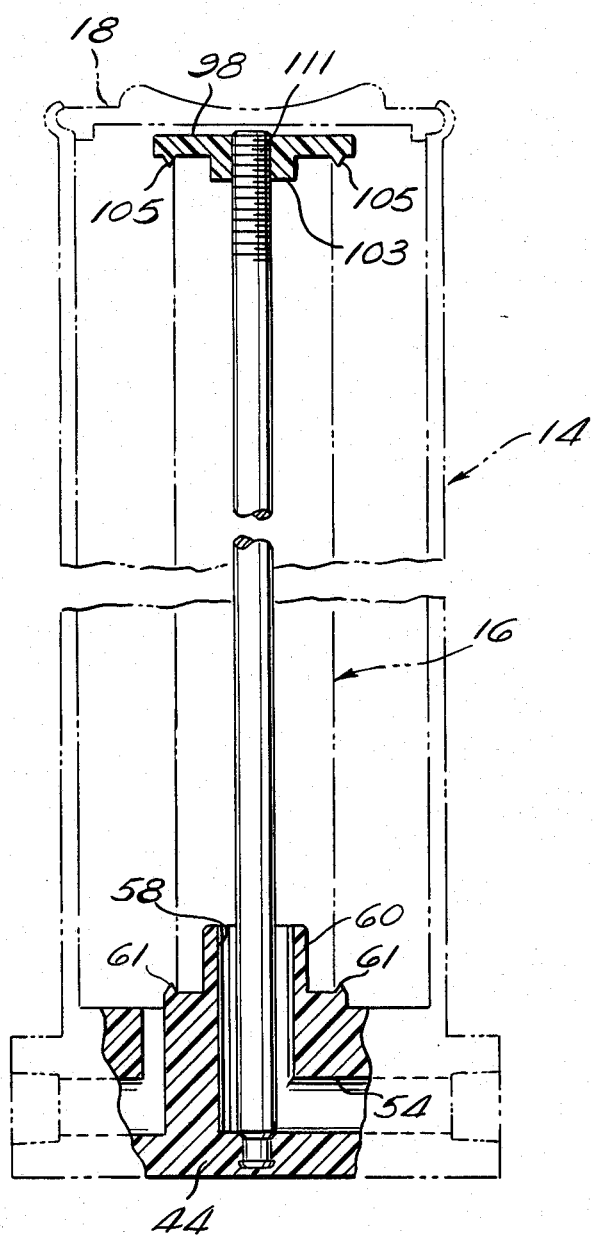
FIG. 12 is a cross-sectional side view taken along line 4—4 in FIG. 1, similar to FIG. 4, of an alternate means for securing the filter element.

An alternate arrangement for retaining the filter element 16 is shown in FIG. 12. A rod 95 is anchored in the housing ring 44 and extends upwardly through the circular opening 58 in the pipe 60 into the interior of the inner housing assembly 14. The anchored rod 95 is of a pre-selected length, depending upon the length of the filter element 16 that is placed within the inner housing assembly 14. Anchoring of the rod 95 can be accomplished in a variety of ways, such as threading (as shown), cementing, or by utilizing a snap-fit connection. A retaining cap 98 is received by the rod 95 and includes a pipe portion 103 and surrounding boss structure 105 that seat the free end of the filter element 16. The retaining cap 98 may be attached to the rod 95 by a variety of mechanical connections; a threaded connection 111 is shown in FIG. 12. The rod 95 and the retaining cap 98 permit the employment of filter elements having a wide variety of lengths, either by varying the rod length or by providing an adjustable mechanism for attaching the retaining cap is attached to the rod (for example the entire length of the rod 95 could be threaded). However, as a practical matter, the excess space within the inner housing assembly 14 would translate into an unnecessary volume of fluid held within the housing assembly 14. In applications where the fluid cost is a significant factor, it is preferred to reduce the dimensions of the entire filter assembly rather than make adjustments utilizing the rod 95 and retaining cap 98 of this alternate embodiment.

As can be seen from FIG. 5, rotating the rings 30, 32, 44 along the interface 62 or the interface 64 will alter the flow of fluid through the filter. For example, if the bores 46,50,52 and the openings 54 are aligned, as shown in FIG. 5, fluid from the supply line will flow through the bore 46', the base 10, and the rings 30,32,44; into the inner housing assembly 14, through the filter element 16, into the circular openings 58 in the pipe 60; and back through the bores 52,50 on the opposite side of the rings 30,32 and out of the base 10 via the bore 46". The rings 30,32,44 can also be aligned so that fluid in the blow-down line is passed through the filter or they can be aligned to completely shut off flow through the filter. The rings 30,32,44 are positioned by rotating the handle 22 (FIG. 1) attached to the inner housing assembly 14. When the handle 22 is rotated, the housing ring 44 rotates through the same angle since it is permanently attached to and non-rotatable with respect to the inner housing assembly 14 to which the handle 22 is connected. The rotation of the housing ring 44 causes the middle ring 32 and the base ring 30 to rotate. The angle through which these two rings 32,30 rotate in response to the rotation of the housing ring 44 is governed by the use of valve actuators, shown here as peg-and-groove assemblies.

FIG. 6 illustrates an example of a peg-and-groove arrangement. FIG. 6 shows portions of the base 10 and the base ring 30. A cylindrical peg 70 is located on the lower inner surface 36 of the base 10. This peg 70 rides within a groove 72 formed in the lower surface 73 of the base ring 30. The base ring 30 can be rotated until an end wall 74 (or an opposite end wall 76, not shown) of the groove comes in contact with the peg 70. At this point further rotation of the base ring 30 is prevented. Thus the length of the groove 72 defines the angle through which the base ring 30 can rotate with respect to the base 10. The groove 72 in the base ring 30 may also include a plurality of temporary stops 78. The temporary stops 78 are triangularly shaped and jut from the upper portion of the groove 72. When the temporary stops 78 pass over the peg 70 in the base 10, a slight bump is generated. This bump allows the person turning the handle 22 to know at what position the base ring 30 is relative to the base 10. FIG. 7 illustrates a pair of temporary stops 78, 78 located in the groove 72 of the base ring 30. When the base ring 30 is rotated so that the peg 70 in the base 10 comes to rest between the two temporary stops 78, the operator knows, for example, that the blow-down line bores 48 are aligned with the base ring bores 50 so that the blow-down operation can take place. To assist in illustrating how the peg-and-groove arrangements cooperate to achieve the various operating positions in the ring system, FIGS. 5, 9, 10, and 11 have been modified to show the end walls 74, 76 and the temporary stops 78 schematically, with the pegs 70, 80 and the groove 82 shown in phantom.

There are three operating positions for the base ring 30 with respect to the base 10. First, when the peg 70 is adjacent to one end wall 76 of the groove 72, the base ring bores 50 will be aligned with the supply line bores 46 so that fluid will be flowing through for filtration. Second, when the peg 70 is between the two temporary stops 78 in the groove 72, the base ring bores 50 will be aligned with the blow-down line bores 48 so that the blow-down operation can take place. Third, when the peg 70 is adjacent to the other end wall 74 of the groove 72, the bores 46,48 in the base 10 are blocked by the base ring 30 so that no fluid may pass.

In addition to the peg-and-groove arrangement between the base 10 and the base ring 30, there is another peg-and-groove arrangement between the middle ring 32 and the housing ring 44. FIG. 8 illustrates portions of the inner surface 43 of the middle ring 32 and the housing ring 44. Attached to the outer surface 45 of the housing ring 44 is a peg 80. This peg 80 rides within a groove 82 with two ends 84, 86 formed in the inner surface 43 of the middle ring 32. The two ends 84, 86 of the groove 82 confine the peg 80 and allow the housing ring 44 to rotate through a total angle of 45 degrees.

Although not required, further structural reliability is obtained in the preferred embodiment by providing a duplicate of each peg-and-groove arrangement located diametrically opposed from those described. Thus, in the preferred embodiment there are two diametrically opposed pegs 70 in the base 10 and two diametrically opposed grooves 72 in the base ring 30, and two pegs 80 on the housing ring 44 and two grooves 82 in the middle ring 32 (best shown in FIG. 5). This dual peg-and-groove arrangement ensures that the rotational operation of the filter will remain unchanged if one of the pegs 70,80 breaks. In the course of normal operation of a closed circulating system in which this filter is used, the inner housing assembly 14 is periodically replaced as the filter element 16 becomes clogged. Referring to FIG. 2, to install a new inner housing assembly 14, the operator must place the new inner housing assembly 14 into the outer housing 12 so that the tabs 26 in the cover 18 are aligned with the spaces 28 in the outer housing 12. The handle 22 is then rotated clockwise by the operator through an angle of 135 degrees. The interaction of the rings 30, 32, 44 and the base 10 during this rotation will now be described in detail.

Figure 9:
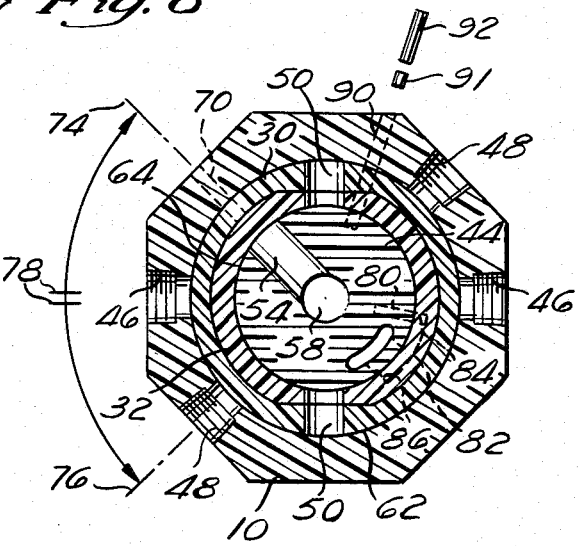
FIG. 9 is a cross-sectional top view of the filter taken along line 5—5 in FIG. 4 when the filter is configured for removal.

Before the start of rotation, the filter is configured as shown in FIG. 9. The pegs 80 on the housing ring 44 are adjacent to the ends 84 of the grooves 82 in the middle ring 32 so that the bores 54 in the housing ring 44 are blocked by the surface 43 of the middle ring 32 at the middle housing ring interface 64. Also, the pegs 70 on the base 10 are adjacent to the end walls 74 of the grooves 72 in the base ring 30 so that the bores 46,48 in the base 10 are blocked by the surface 37 of the base ring 30 at the base-base ring interface 62.

Figure 10:
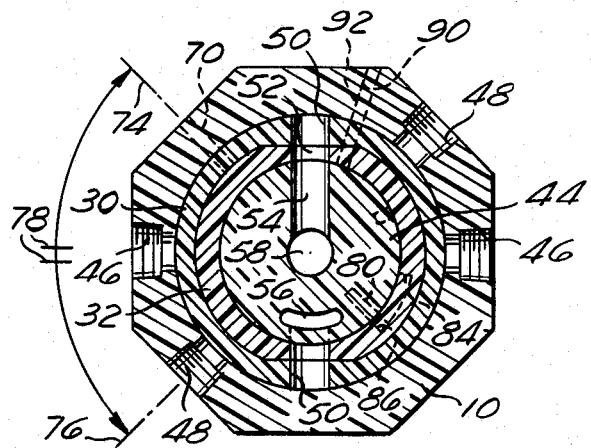
FIG. 10 is a cross-sectional top view of the filter taken along line 5—5 in FIG. 4 when the filter has been rotated 45 degrees clockwise from the filter configuration shown in FIG. 9.

During the initial 45 degrees of the 135-degree rotation, only the housing ring 44 turns. The pegs 80 ride within the grooves 82 and do not turn the middle ring 32. When 45 degrees of rotation is completed, the pegs 80 come in contact with the other ends 86 of the grooves 82. FIG. 10 illustrates the position of the rings 30,32,44 and the base 10 at this point. The bores 54 in the housing ring 44 are aligned with the bores 50, 52 of the base ring 30 and the middle ring 32.

Figure 11:
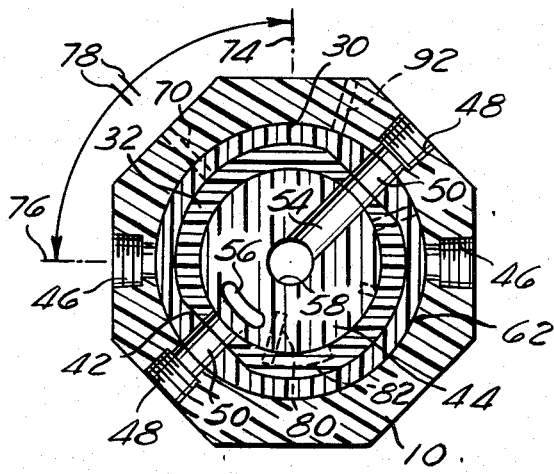
FIG. 11 is a cross-sectional top view of the filter taken along line 5—5 in FIG. 4 when the filter is configured for the blow-down operation.

During the second 45-degree portion of the rotation, the middle and the base rings 32,30, locked together by the flat surfaces 42 on the base ring 30 and the middle ring 32, are forced to rotate together with the housing ring 44 by the pressure of the pegs 80 against the ends 86 in the middle ring 32. Also, the grooves 72 in the base ring 30 start to travel over the pegs 70 in the base 10. As 90 degrees of rotation is reached (from the initial position), the temporary stops 78 in grooves 72 will lie on either side of the pegs 70 in the base 10. FIG. 11 illustrates the position of the rings 30,32,44 and the base 10 at this point in the rotation. The bores 48,50,52 will be aligned with the openings 54 in the housing ring 44 so that fluid from the blow-down line travels through the filter. When the filter is rotated the last 45 degrees of the 135-degree rotation, the bores 46,50,52 will be aligned with the openings 54 in the housing ring 44 so that fluid from the filter supply line is filtered. At this point the pegs 70,80 abut against the groove ends 76,86 so that further rotation is prevented. FIG. 5 illustrates the position of the rings 30,32,44 and the base 10 at this point.

In order to remove the inner housing assembly 14 from the filter, the filter is first positioned so that the blow-down operation takes place and then the inner housing assembly 14 can be removed and discarded. In order to move the filter from the filtering configuration to the blow-down configuration, the operator must rotate the handle 22, 90 degrees counterclockwise, then 45 degrees clockwise. During the first 45 degrees of the 90-degree counterclockwise turn, the pegs 80 on the housing ring 44 move to the first end 84 of the grooves 82 in the middle ring 32. With no force being exerted by the pegs 80, the middle ring 32 does not move. During the last 45 degrees of the counterclockwise turn, the pegs 80 engage with the first end 84 and cause the middle and base rings 32,30 to turn.

At the completion of the 90-degree counterclockwise turn, the bores 50,52 in the base and middle rings 30,32 are aligned with the blow-down line bores 48 in the base 10. However, the initial 45 degrees of rotation that the housing ring 44 makes before the middle and base rings 32, 30 begin moving causes the housing ring 44 to be 45 degrees out of phase and the circular opening 54 in the housing ring 44 to be blocked. To align this opening with the middle and base ring bores 52, 50, and with the blow-down line bores 48, the handle 22 must be rotated 45 degrees clockwise. This rotation will only cause the housing ring 44 to rotate since the pegs 80 travel to the other ends 86 of the grooves 82 in the middle ring 32. At the completion of this turn, all the bores 48,50,52 are aligned with the opening 54 in the housing ring 44 so that the blow-down operation may occur. FIG. 11 illustrates the configuration of the filter at this point.

An alternate method for obtaining the blow-down bore alignment is to complete the remaining steps in the filter removal process, (as will be discussed hereinafter), but instead of removing the inner housing assembly 14, rotation is again initiated in a clockwise direction. The rotation proceeds as was previously described in connection with the filter installation until the blowdown position is obtained (after 90 degrees of rotation). This alternate method makes use of the temporary stops 78 in the groove 72 to locate the position of proper alignment, whereas the previously described method relies upon the inexact 45 degree counter-clockwise rotation of the housing ring 44.

After the blow-down operation forces out the remaining fluid from the inner housing assembly 14 and the filter element 16, the now-empty inner housing assembly 14 may be removed and discarded. To achieve removal, the handle 22 must be rotated 90 degrees counterclockwise. During the first 45 degrees of this rotation, only the housing ring 44 rotates since the pegs 80 are traveling within the grooves 82 in the middle ring 32. During the second 45 degrees of the rotation, the pegs 80 force the middle and base rings 32,30 to turn counterclockwise. At the completion of this rotation, the circular openings 54 will be blocked by the inner surface 43 of the middle ring 32 at the middle housing ring interface 64 to prevent leakage from the inner housing assembly 14. The supply line bores 46 and the blow-down bores 48 will be blocked by the outer surface 37 of the base ring 30 at the base-base ring interface 62, preventing any leakage from the supply line or blow-down line. The two tabs 26 in the cover 18 will be aligned with the spaces 28 in the outer housing 12, permitting the inner housing assembly 14 to be lifted out of the base 10. It should be again noted that removal of the inner housing assembly 14 can occur only when the bores 46,48 and openings 54 are blocked, thus preventing leakage from the supply and blow-down lines and from the inner housing assembly 14.

Another feature of the preferred embodiment is a cylindrical bore 90 shown in FIG. 9. FIG. 9 illustrates the position of the base 10 and rings 30,32,44 just prior to removal of the inner housing assembly 14, after the counterclockwise rotation has been completed. In this position, all of the bores 46,48,50 and the openings 54 are completely blocked off so that no fluid can leak. The filter ring assembly can be locked in this position by inserting a first and a second locking pin 91, 92 into the bore 90 to prevent rotation of the rings 30,32,44 and the base 10. To lock the filter ring assembly in this position, the short, first locking pin 91 is inserted all of the way into bore 90 so that the pin 91 does not protrude from the middle ring 32. This short pin 91 locks the middle ring 32 with respect to the housing ring 44. After this short pin 91 is inserted, the inner housing assembly 14 may be removed from the base 10 and discarded. The short pin 91 will ensure that no fluid leaks from the inner housing assembly 14 at any time after it has been discarded. After the inner housing assembly 14 has been removed, another pin may be inserted into bore 90 to prevent rotation of the base ring 30 with respect to the base 10. This will ensure that no fluid leaks from the supply or blow-down lines. It should be noted that bore 90 is aligned along a straight line only when the rings 30,32,44 and the base 10 are positioned as in FIG. 9, just prior to the removal of the inner housing assembly 14.

The preferred embodiment also includes the addition of an annular ring or washer 116 to the top of the base 10 as shown in FIG. 3. A first surface 117 of the washer 116 is received by the annular recess 38 formed in the base 10. A second surface 118, elevated from the first surface 117, rests upon an annular elevation 119 formed inside of the annular recess 38. The inside diameter of the washer 116 is slightly smaller than that of the base 10 at its top; thus the second surface 118 of the washer 116 also contacts the top outer perimeter of the base ring 30. The contact of the washer 116 with the base ring 30 assists in the seating of the base ring 30, permitting rotation of the base ring 30 to occur only in a horizontal plane. During assembly of the filter, the washer 116 is added to the top of the base 10 after the base ring 30 has been inserted into the base 10. The base ring 30 and the middle ring 32 are made of a resilient plastic such as polypropylene to facilitate assembly.

Although the foregoing discussion has described a filter, the described device will function as a fluid sample taker when the filter element 16 is removed. The described device can also be used to add materials to a fluid stream. In the medical field, a sterile delivery system can be produced or, alternatively, a safe means of collecting infectious materials can be provided. All of the above-described applications for my invention embody the principle of extracting from or adding to a closed fluid circuit without exposing operating personnel or the surrounding environment to the circulating fluid or the impurities therein. Although a preferred embodiment of the invention has herein been disclosed, it is to be understood that the present disclosure is made by way of examples, and that variations are possible without departing from the subject matter coming within the scope of the following claims, which subject matter is regarded as the invention.

What is claimed is:

1. An apparatus comprising:
 a container having an inlet orifice and an outlet orifice;
 a base for removably supporting said container;
 a fluid inlet passage in said base;
 a fluid outlet passage in said base;
 plural valves for selectively interconnecting said inlet passage to said inlet orifice and said outlet passage to said outlet orifice and for selectively sealing the inlet and the outlet orifices and the inlet and the outlet passages; and
 a valve actuator for operating said plural valves in response to insertion and removal of said container in said base to allow fluid to flow from said inlet passage, into said inlet orifice, and through said container when said container is inserted into said base and to seal the orifices and the passages to prevent leakage of said fluid from both said container and said base when said container is removed from said base.

2. An apparatus as defined in claim 1, wherein said apparatus is a filter and said base contains a second fluid inlet passage, said second inlet passage being selectively interconnectable to said inlet orifice, additionally comprising a filter element to filter fluid inside said container.

3. An apparatus comprising:
a container having an inlet orifice and an outlet orifice;
a base for removably supporting said container;
a fluid inlet passage in said base;
a fluid outlet passage in said base;
plural valves for selectively interconnecting said inlet passage to said inlet orifice and said outlet passage to said outlet orifice, said valves comprising concentric rings, said rings being generally cylindrical in shape with a bore through their longitudinal axes, each said ring having a plurality of ring orifices wherein said rings can be positioned to accomplish said selective interconnecting of said inlet passage to said inlet orifice and said outlet passage to said outlet orifice; and
a valve actuator for operating said concentric rings in response to insertion and removal of said container in said base to allow fluid to flow from said inlet passage, into said inlet orifice, and through said container when said container is inserted into said base and to prevent leakage of said fluid from both said container and said base when said container is removed from said base.

4. An apparatus as defined in claim 3 wherein said positioning is accomplished by rotating said rings about their centers.

5. An apparatus as defined in claim 4 wherein said valve actuator comprises:
a groove in one of said rings; and
a peg, said peg riding within said groove.

6. An apparatus as defined in claim 5, additionally comprising a locking device, said locking device preventing rotation of said rings when said locking device is actuated.

7. An apparatus as defined in claim 6 wherein a first ring of said rings is concentric to and within said base, rotatable with respect to said base, and nonremovable from said base; and wherein another of said rings is concentric to and within said first ring, non-rotatable with respect to said first ring, and removable from said first ring; additionally comprising a third ring, said third ring permanently attached to and non-rotatable with respect to said container, concentric to, within, and rotatable with respect to said second ring, and nonremovable from said second ring.

8. An apparatus as defined in claims 3 or 6 wherein said apparatus is a filter and said base contains a second fluid inlet passage, said second inlet passage being selectively interconnectable to said inlet orifice, additionally comprising a filter element to filter fluid inside said container.

9. An apparatus as defined in claim 8, and further comprising:
adjustable means within said container for securing said filter element to an inner container base.

10. An apparatus as defined in claim 9, wherein said adjustable means comprises:
a retaining rod attached to said inner base and sized to receive said filter element; and
a retaining cap attached to the retaining rod in a manner that forces the filter element against said inner base.

11. An apparatus as defined in claim 8, wherein said base contains a second fluid outlet passage, said second outlet passage being selectively interconnectable to said outlet orifice.

12. An apparatus comprising:
a container having an inlet orifice and an outlet orifice;
a base for removably supporting said container;
a first fluid inlet passage in said base;
a second fluid inlet passage in said base;
a first fluid outlet passage in said base;
a second fluid outlet passage in said base;
plural valves for selectively interconnecting said inlet passages to said inlet orifice and said outlet passages to said outlet orifice and for selectively sealing the inlet orifice and the outlet orifice and the inlet passages and the outlet passages; and
a valve actuator for operating said plural valves in response to positioning said container in said base to allow fluid to flow into said container from said first inlet passage and out said first outlet passage when said container is in a first position and into said container from said second inlet passage and out said second outlet passage when said container is in a second position and to seal the inlet and the outlet orifices and the inlet passages and the outlet passages removal or insertion of the container from or into said base.

13. An apparatus as defined in claim 12, and further comprising:
a second fluid outlet passage in said base, said valve actuator allowing fluid to flow from said container through said second fluid outlet when said container is in the second position.

14. A method of separating and removing a section of a fluid flow conduit from a fluid circulation system, said section selectively removable from said fluid flow conduit at a specific release position of said section relative to said conduit, said system including an inlet passage for supplying fluid to said section and an outlet passage for conducting fluid from said section, said inlet passage and outlet passage including inlet and outlet valves, respectively, said inlet and outlet valves having a first, closed, sealed position and a second opened position, and said section including a section valve for sealing said section when said section is removed from said system, said section valve having a first, closed, sealed position and a second, opened position, the selection of said first and said second positions for both said inlet and outlet valves and said section valve dependent upon the position of said section relative to said conduit, with said first, sealed position in both cases corresponding to said release position, comprising:
first closing said inlet and outlet valves automatically in response to placing said section in said release position prior to removal of said section from said system; and
second closing said section valve automatically in response to placing said section in said release position prior to removal of said section from said system.

15. A method as defined in claim 14 additionally comprising locking said valves in place to prevent the leakage of said fluid from either said section or said fluid circulation system upon removal of said section from said system.

16. A method as defined in claims 14 or 15, additionally comprising:
filtering said fluid as it passes through said section; and introducing fluid at a second inlet passage before said closing of said section valve.

17. A method as defined in claim 14, additionally comprising:
removing said fluid from the second inlet passage through a second outlet passage before said closing of said section valve.

18. A method of separating and removing a section of a fluid flow conduit from a fluid circulation system, said system including a first inlet passage for supplying a first fluid to said section, a second inlet passage for supplying a second fluid to said section, and a first outlet passage for conducting said first fluid from said section, and a second outlet passage for conducting said second fluid from said section, said first and second inlet passages and said first and second outlet passages including first and second inlet valves and first and second outlet valves, respectively, said first and second inlet valves and said first and second outlet valves contemporaneously having a sealed position in response to placing said section in a specific release position with respect to said system, comprising:
allowing said first fluid to pass from said first inlet passage into said section in response to placing said section in a first position with respect to said system;
allowing said second fluid to pass from said second inlet passage into said section in response to placing said section in a second position with respect to said system;
filtering said first or second fluids;
allowing said first or second fluids to pass out of said outlet passage into said system;
closing said inlet valves and said outlet valves and sealing said inlet passages and said outlet passages in response to placing said section in said specific release position with respect to said system, and
removing said section from said fluid circulation system.

19. A method as defined in claim 18, and further comprising:
removing the first fluid from said section through the first outlet passage in response to placing said section in a first position with respect to said system; and
removing the second fluid from said section through the second outlet passage in response to placing said section in a second position with respect to said system.

* * * * *